(12) United States Patent
Gernhardt et al.

(10) Patent No.: US 11,943,203 B2
(45) Date of Patent: *Mar. 26, 2024

(54) VIRTUAL NETWORK REPLICATION USING STAGGERED ENCRYPTION

(71) Applicant: Snowflake Inc., Bozeman, MT (US)

(72) Inventors: Robert Bengt Benedikt Gernhardt, Seattle, WA (US); Mikhail Kazhamiaka, Bellevue, WA (US); Eric Robinson, Sammamish, WA (US); Rodney Weaver, Kenmore, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,493

(22) Filed: Nov. 15, 2022

(65) Prior Publication Data

US 2023/0073653 A1 Mar. 9, 2023

Related U.S. Application Data

(63) Continuation of application No. 17/808,429, filed on Jun. 23, 2022, now Pat. No. 11,539,672, which is a
(Continued)

(51) Int. Cl.
*H04L 9/40* (2022.01)
*G06F 16/27* (2019.01)

(52) U.S. Cl.
CPC .......... *H04L 63/0272* (2013.01); *G06F 16/27* (2019.01); *H04L 63/0281* (2013.01); *H04L 63/0435* (2013.01)

(58) Field of Classification Search
CPC . H04L 63/02; H04L 63/0281; H04L 63/0435; G06F 16/2772
See application file for complete search history.

(56) References Cited

U.S. PATENT DOCUMENTS 7,433,359 B2 10/2008 Havala et al.
7,502,796 B2 3/2009 Parkkinen et al.
(Continued)

FOREIGN PATENT DOCUMENTS

CN 107483390 12/2017
CN 111052106 4/2020
(Continued)

OTHER PUBLICATIONS

"Chinese Application Serial No. 202180001744.3, Office Action dated Feb. 24, 2023", with machine English translation, 13 pages.
(Continued)

*Primary Examiner* — Ghodrat Jamshidi
(74) *Attorney, Agent, or Firm* — Schwegman Lundberg & Woessner, P.A.

(57) ABSTRACT

A method includes selecting, by at least one hardware processor of a first database deployment, data for transmission to a second database deployment. The data includes a plurality of files forming a data stream. At least a first file of the plurality of files is encoded using a first encryption key which is stored in at least a second file of the plurality of files. The at least a first file is further encoded to include a second encryption key associated with at least a third file of the plurality of files. A set of nodes is identified in a virtual private network connected to the first and second database deployments. The data stream is transmitted from the first database deployment to the second database deployment via the set of nodes of the virtual private network that is connected to the first database deployment and the second database deployment.

30 Claims, 10 Drawing Sheets

Related U.S. Application Data continuation of application No. 17/644,854, filed on Dec. 17, 2021, now Pat. No. 11,374,908, which is a continuation of application No. 17/463,338, filed on Aug. 31, 2021, now Pat. No. 11,223,603, which is a continuation of application No. 17/219,716, filed on Mar. 31, 2021, now Pat. No. 11,134,061, which is a continuation of application No. 17/162,919, filed on Jan. 29, 2021, now Pat. No. 11,063,911, which is a continuation of application No. 17/086,258, filed on Oct. 30, 2020, now Pat. No. 10,999,252, which is a continuation of application No. 16/862,996, filed on Apr. 30, 2020, now Pat. No. 10,855,660.

(56) References Cited

U.S. PATENT DOCUMENTS

| | | | |
|---|---|---|---|
| 9,514,164 B1* | 12/2016 | Matic | G06F 16/2365 |
| 9,736,047 B2 | 8/2017 | Chan et al. | |
| 10,063,429 B2 | 8/2018 | Caison et al. | |
| 10,153,943 B2 | 12/2018 | Mulligan et al. | |
| 10,268,704 B1 | 4/2019 | Sanderson et al. | |
| 10,346,374 B1 | 7/2019 | Johnson et al. | |
| 10,447,498 B2 | 10/2019 | De Luca | |
| 10,547,679 B1 | 1/2020 | Burnett et al. | |
| 10,855,660 B1 | 12/2020 | Gernhardt et al. | |
| 10,909,120 B1* | 2/2021 | Mohamad | G06F 16/24554 |
| 10,999,252 B1 | 5/2021 | Gernhardt et al. | |
| 11,063,911 B1 | 7/2021 | Gernhardt et al. | |
| 11,134,061 B1 | 9/2021 | Gernhardt et al. | |
| 11,157,664 B2 | 10/2021 | Higginson et al. | |
| 11,223,603 B2 | 1/2022 | Gernhardt et al. | |
| 11,374,908 B2 | 6/2022 | Gernhardt et al. | |
| 2003/0014523 A1 | 1/2003 | Teloh et al. | |
| 2003/0024523 A1 | 2/2003 | Ching-hui | |
| 2003/0200168 A1* | 10/2003 | Cullen, III | G06Q 30/04 |
| | | | 705/37 |
| 2004/0174887 A1 | 9/2004 | Lee | |
| 2007/0078937 A1* | 4/2007 | DelGaudio | G06Q 10/087 |
| | | | 709/206 |
| 2009/0037607 A1 | 2/2009 | Farinacci et al. | |
| 2011/0106759 A1 | 5/2011 | Brown, III | |
| 2012/0047107 A1 | 2/2012 | Doddavula et al. | |
| 2012/0059839 A1 | 3/2012 | Andrade et al. | |
| 2012/0131093 A1 | 5/2012 | Hamano et al. | |
| 2013/0204849 A1 | 8/2013 | Chacko | |
| 2013/0346619 A1 | 12/2013 | Panuganty et al. | |
| 2014/0230044 A1 | 8/2014 | Liu et al. | |
| 2015/0039557 A1 | 2/2015 | Howard et al. | |
| 2015/0052523 A1 | 2/2015 | Raghu | |
| 2015/0295751 A1 | 10/2015 | Caison et al. | |
| 2016/0048408 A1 | 2/2016 | Madhu et al. | |
| 2016/0329965 A1 | 11/2016 | Cook et al. | |
| 2017/0262204 A1 | 9/2017 | Dornemann et al. | |
| 2017/0262350 A1 | 9/2017 | Dornemann | |
| 2018/0062880 A1 | 3/2018 | Yu et al. | |
| 2018/0062917 A1 | 3/2018 | Chandrashekhar et al. | |
| 2018/0146068 A1 | 5/2018 | Johnston et al. | |
| 2018/0260466 A1 | 9/2018 | Jacoby et al. | |
| 2018/0284999 A1* | 10/2018 | Aslam | G06F 3/067 |
| 2019/0141015 A1 | 5/2019 | Nellen | |
| 2019/0227998 A1 | 7/2019 | Wang et al. | |
| 2019/0251180 A1* | 8/2019 | Lachambre | G06F 16/258 |
| 2019/0347404 A1 | 11/2019 | Bengtson | |
| 2020/0036707 A1 | 1/2020 | Callahan et al. | |
| 2020/0067734 A1 | 2/2020 | Hira et al. | |
| 2020/0092259 A1 | 3/2020 | Bjäre et al. | |
| 2020/0134080 A1 | 4/2020 | Freund et al. | |
| 2020/0301942 A1 | 9/2020 | Robinson et al. | |
| 2021/0029195 A1 | 1/2021 | Kolbe et al. | |
| 2021/0056121 A1 | 2/2021 | Jayanthi | |
| 2021/0081379 A1* | 3/2021 | Buehne | G06F 16/214 |
| 2021/0182115 A1* | 6/2021 | Gera | G06F 16/27 |
| 2021/0303404 A1* | 9/2021 | Shah | G06F 11/1448 |
| 2021/0392114 A1 | 12/2021 | Gernhardt et al. | |
| 2022/0116360 A1 | 4/2022 | Gernhardt et al. | |
| 2022/0321538 A1 | 10/2022 | Gernhardt et al. | |

FOREIGN PATENT DOCUMENTS

| | | |
|---|---|---|
| CN | 111066300 | 4/2020 |
| CN | 113875206 A | 12/2021 |
| WO | WO-2021/222543 A1 | 11/2021 |

OTHER PUBLICATIONS

"Chinese Application Serial No. 202180001744.3, Response filed Jun. 25, 2023 to Office Action dated Feb. 24, 2023", with English claims, 19 pages.

"U.S. Appl. No. 16/862,996, Notice of Allowance dated Sep. 2, 2020", 15 pgs.

"U.S. Appl. No. 17/086,258, Notice of Allowance dated Jan. 12, 2021", 10 pgs.

"U.S. Appl. No. 17/162,919, Corrected Notice of Allowability dated Jun. 17, 2021", 2 pgs.

"U.S. Appl. No. 17/162,919, Notice of Allowance dated Mar. 31, 2021", 15 pgs.

"U.S. Appl. No. 17/219,716, Notice of Allowance dated Jul. 2, 2021", 14 pgs.

"U.S. Appl. No. 17/219,716, Preliminary Amendment filed Apr. 15, 2021", 6 pgs.

"U.S. Appl. No. 17/463,338, Notice of Allowance dated Nov. 18, 2021", 10 pgs.

"U.S. Appl. No. 17/644,854, Notice of Allowance dated Apr. 8, 2022", 15 pgs.

"U.S. Appl. No. 17/808,429, Notice of Allowance dated Sep. 1, 2022", 10 pgs.

"International Application Serial No. PCT/US2021/029864, International Preliminary Report on Patentability dated Nov. 10, 2022", 5 pgs.

"International Application Serial No. PCT/US2021/029864, International Search Report dated May 18, 2021", 2 pgs.

"International Application Serial No. PCT/US2021/029864, Written Opinion dated May 18, 2021", 3 pgs.

* cited by examiner

VIRTUAL NETWORK REPLICATION USING STAGGERED ENCRYPTION

CROSS-REFERENCE TO RELATED APPLICATIONS

This application is a Continuation of U.S. patent application Ser. No. 17/808,429, filed Jun. 23, 2022, which is a Continuation of U.S. patent application Ser. No. 17/644,854, filed Dec. 17, 2021 and issued on Jun. 28, 2022 as U.S. Pat. No. 11,374,908; which is a Continuation of U.S. patent application Ser. No. 17/463,338, filed Aug. 31, 2021 and issued on Jan. 11, 2022 as U.S. Pat. No. 11,223,603; which is a Continuation of U.S. patent application Ser. No. 17/219,716 filed Mar. 31, 2021 and issued on Sep. 28, 2021 as U.S. Pat. No. 11,134,061; which is a Continuation of U.S. patent application Ser. No. 17/162,919 filed Jan. 29, 2021 and issued on Jul. 13, 2021 as U.S. Pat. No. 11,063,911; which is a Continuation of U.S. patent application Ser. No. 17/086,258 filed Oct. 30, 2020 and issued on May 4, 2021 as U.S. Pat. No. 10,999,252; which is a Continuation of U.S. patent application Ser. No. 16/862,996 filed Apr. 30, 2020 and issued on Dec. 1, 2020 as U.S. Pat. No. 10,855,660, the contents of which are incorporated by reference herein in their entireties.

TECHNICAL FIELD

The present disclosure generally relates to special-purpose machines that manage database data and improvements to such variants, and to the technologies by which such special-purpose machines become improved compared to other special-purpose machines for transmitting database data between databases connected by a network.

BACKGROUND

Databases are used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, and others.

In some instances, it may be beneficial to replicate database data in multiple locations or on multiple storage devices. Replicating data can safeguard against system failures that may render data inaccessible, cause the data to be lost or cause the data to be permanently unreadable. While replication between different databases increases the safety of the data, the data should be securely transmitted between the replication databases. Some database systems use encryption keys to authenticate one another and to encrypt data sent between the different database systems. For example, a database instance in one datacenter can use an encryption key to authenticate and receive communications from another database instance in another datacenter that is located at a different geographic location. While replication of database data and encryption keys increase the security of the data, implementing such approaches in different networked database systems, such as cloud databases, can be difficult to perform in a manner that is computationally efficient and secure.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
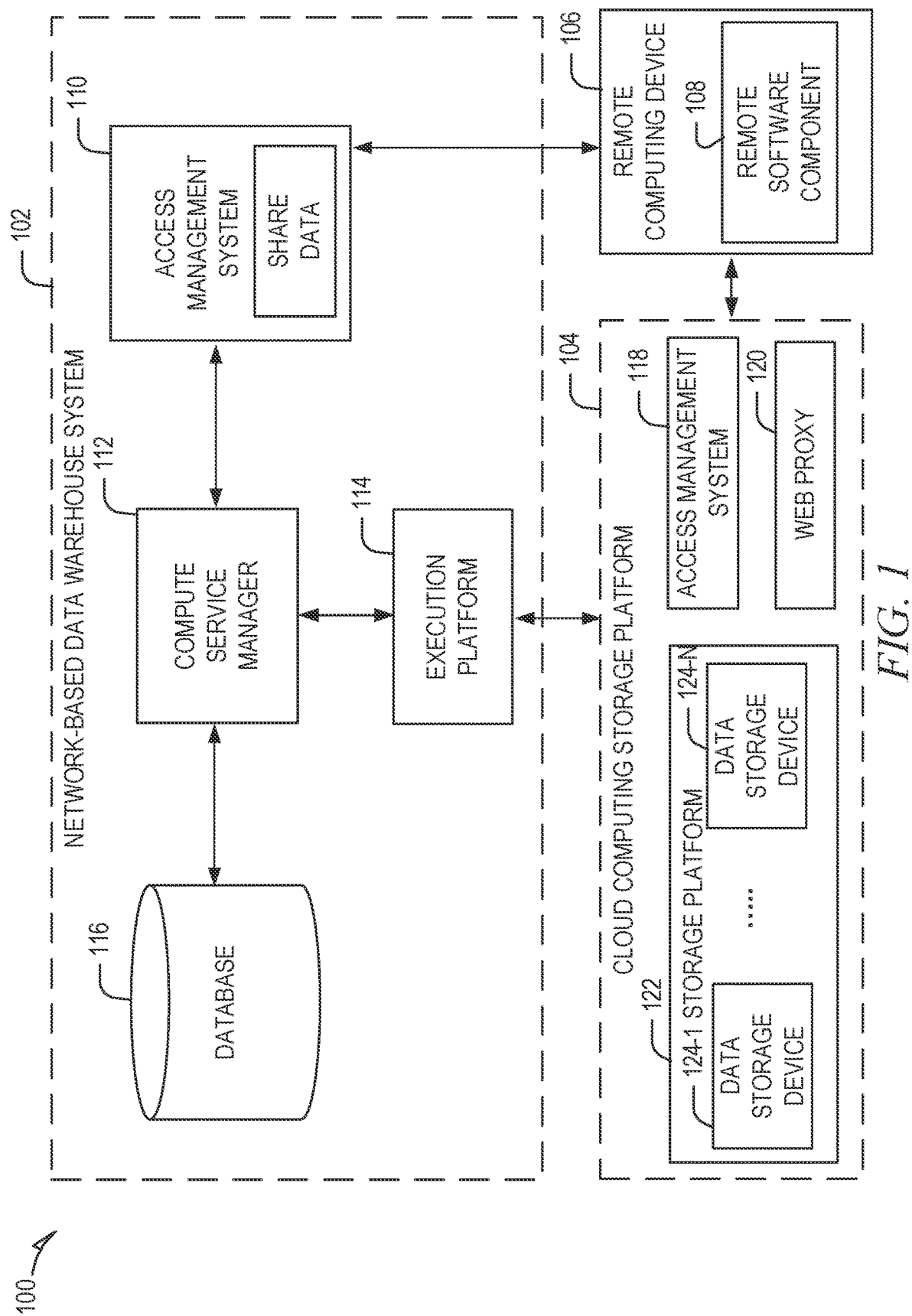
FIG. 1 is a block diagram illustrating an example computing environment in which a network-based data warehouse system can implement streams on shared database objects, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, it can be difficult to securely manage database traffic sent and received between database systems. An example networked database system includes a virtual private cloud deployment that uses cloud data storage devices and cloud compute resources dedicated to that deployment. Different deployments can be linked, and channels can be set up to send and receive data between the deployments. For example, deployment_A can be a deployment (e.g., a database management system (DBMS) running within an Amazon Web Services® (AWS) Virtual Private Cloud (VPC)) at a first region such as San Francisco, and deployment_B can be another deployment (e.g., another DBMS in different AWS VPC) at a second region, such as New York City. Deployment_A and deployment_B can create a link over which a stream of data, such as replication traffic, is sent between the deployments. For example, replication traffic of a primary database in deployment_A can be replicated to a secondary database located in deployment_B.

While it may be possible to replicate the traffic from deployment_A to deployment_B it can still be difficult to ensure that the data takes a certain path or stays within a certain region while in transit between the two deployments. For instance, a database administrator may require that none of its data in its databases ever be transferred over the open Internet. Further, to comply with data governance laws, the database administrator may seek to configure their databases such that all data in the database network stays within a certain region. For example, the database administrator may seek to ensure that all data transferred between deployment_A and deployment_B remain within a given country (e.g., USA) and additionally the data may never be transferred over the open Internet (e.g., encrypted in TLS traffic over the Internet) while in the given country.

Additionally, many VPCs are not configured for replication between the different VPCs and may charge egress export fees (e.g., egress fees) even though the traffic is being replicated to another deployment of the same VPC provider. Further difficulty arises when sending data between different types of database deployments securely. For example, if deployment_A is a VPC from a first provider (e.g., AWS VPC) and deployment_B is a VPC from second different provider (e.g., Google Private Cloud (GPC)), the different providers may have different and potentially incongruent security mechanisms. For instance, deployment_B may implement a hardware security module (HSM) that does not enable importing or exporting of encryption keys, thereby greatly increasing the difficulty and practicality of transferring data between the deployments. Additionally, even when the different deployments have congruent security mechanisms (e.g., each deployment has an HSM that enables import/export of keys), managing the keys as the number of replicated databases increases to enterprise levels (e.g., hundreds of thousands of database customers at the different deployments, where each replicates data to other database in other deployments) is very difficult to implement in a secure manner that scales with network growth.

To address these issues, a replication manager and channel manager can be implemented in a deployment to encrypt the traffic in an approach that is agnostic to various configurations of HSMs and VPCs, and further to transfer the traffic between deployments using nodes of a private network that are external to the deployments. For example, the private network can be a virtual private network (VPN) that implements VPN nodes (e.g., AT&T® NetBond® nodes, a VPN server/node at a first location and another VPN server/node at a second location) to transfer traffic within the virtual private network. When one or more databases in deployment_A send data to another database in deployment_B, e.g., replication traffic, the channel manager can implement a cloud connection (e.g., hosted connections provided by the given VPC provider such as AWS Direct Connect®, or a physical connection such as Ethernet port) to send data from deployment_A to a node of the virtual private network.

Each of the nodes of the virtual private network can be set up and positioned within a given region (e.g., in a country, or avoiding/excluding a specified country), thereby ensuring the data is not transferred outside the region and not exposed or otherwise transferred over the open Internet. The traffic continues over the VPN nodes to the destination database in deployment_B. In some example embodiments, the VPN node nearest deployment_B then imports the traffic into using a cloud connection provided by deployment_B (e.g., hosted connection of the cloud, such as AWS Direct Connect; a direct port connection such as Azure Express Route®; a physical Ethernet cord connecting the VPN node to hardware of deployment_B, etc.).

Additionally, and in accordance with some example embodiments, the traffic is encrypted using internal message keys to efficiently transfer the traffic between the databases at different deployments. In some example embodiments, a replication manager can generate the messages and keys at the database application level, without requiring changes to a given VPC, HSM, or VPN node transfer network. For example, in some example embodiments, the traffic is sent in a sequence of messages using a pre-configured key encryption structure. In some example embodiments, in each message, the data is encrypted by a symmetric key (e.g., data encryption key (DEK) unique to that message). The data encryption key for the given message can be further encrypted by a wrapping replication key (WRK), which can be another symmetric key generated by the sending deployment (e.g., periodically generated by an HSM in deployment_A). In some example embodiments, the WRK is then encrypted by a key from a keypair, such as the public key of the destination deployment. In some example embodiments, the encrypted WRK to access a DEK in a given message is also stored in the given message. In other example embodiments, the WRKs are staggered between messages such that a given messages DEK is encrypted using a previously sent WRK (e.g., a WRK sent in a previously received message). Further, in some example embodiments, the WRKs are rotated based on time expiration periods or randomly to increase security of the data. In this way, the replication manager and channel manager of the database systems (e.g., database applications running on VPNs) can efficiently and securely transmit data between different clouds at the applications level over specific paths even where the cloud systems are incongruent or cannot be customized.

FIG. 1 illustrates an example shared data processing platform 100 in which a network-based data warehouse system 102 implements database stream tracking (e.g., view streams), in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service such as S3, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users. For example, data to be tracked via streams can be stored and accessed on the cloud computing storage platform 104 (e.g., on S3) or stored and accessed on the database 116 that is local to the network-based data warehouse system 102, according to some example embodiments.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-n that are part of a cloud computing storage platform 104. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124 supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing device 106 may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, may be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-$n$ in the cloud computing storage platform 104. Thus, the computing resources and cache resources are not restricted to specific data storage devices 124-1 to 124-$n$. Instead, all computing resources and all cache resources may retrieve data from, and store data to, any of the data storage resources in the cloud computing storage platform 104.

Figure 2:
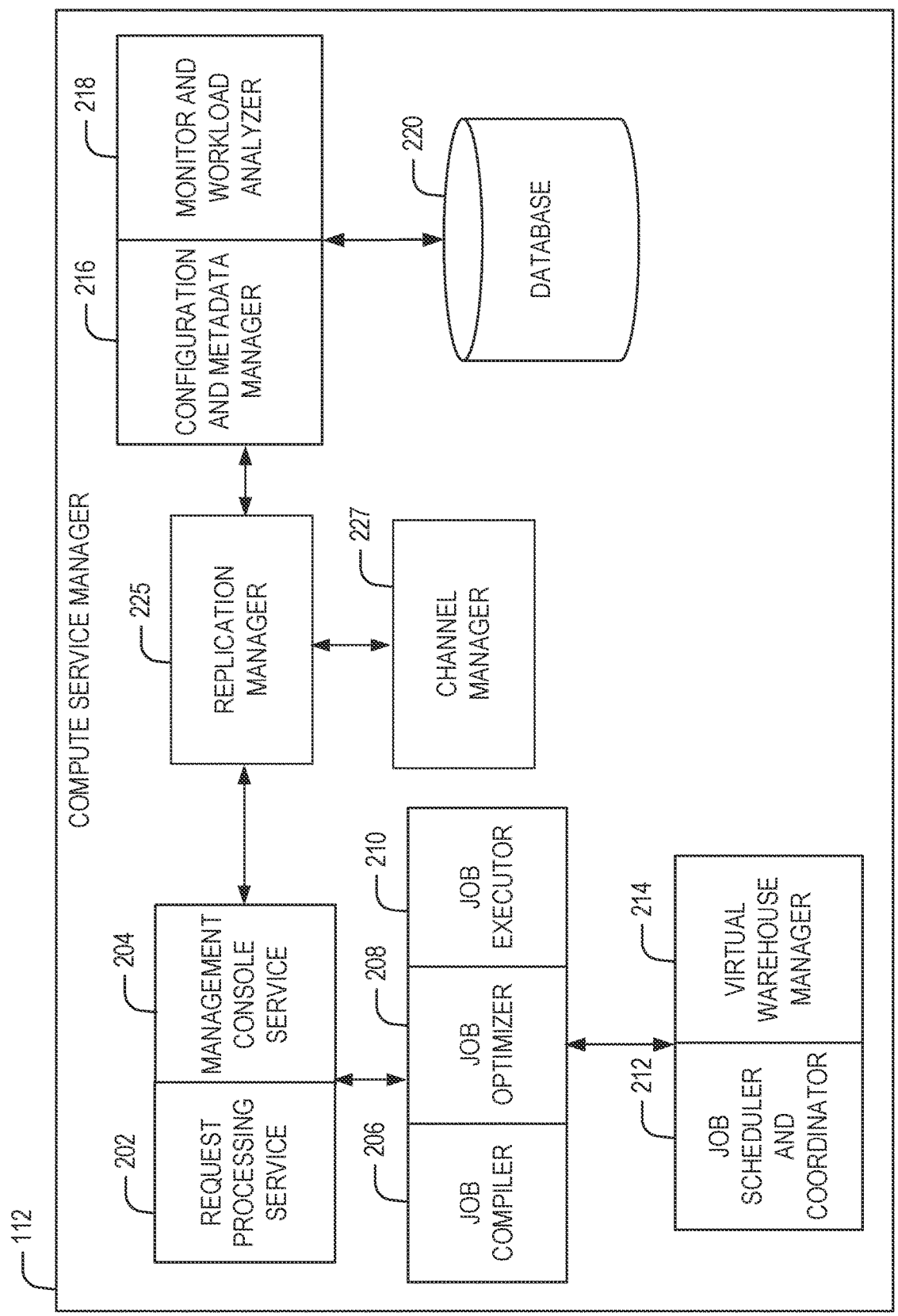
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The replication manager 225 manages transmission of database data, such as replicating database data to one or more secondary databases, according to some example embodiments. The channel manager 227 is configured to send and receive data through a private channel, such as a virtual private network, according to some example embodiments.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. The data storage device 220 in FIG. 2 represents any data storage device within the network-based data warehouse system 102. For example, data storage device 220 may represent caches in execution platform 114, storage devices in cloud computing storage platform 104, or any other storage device.

Figure 3:
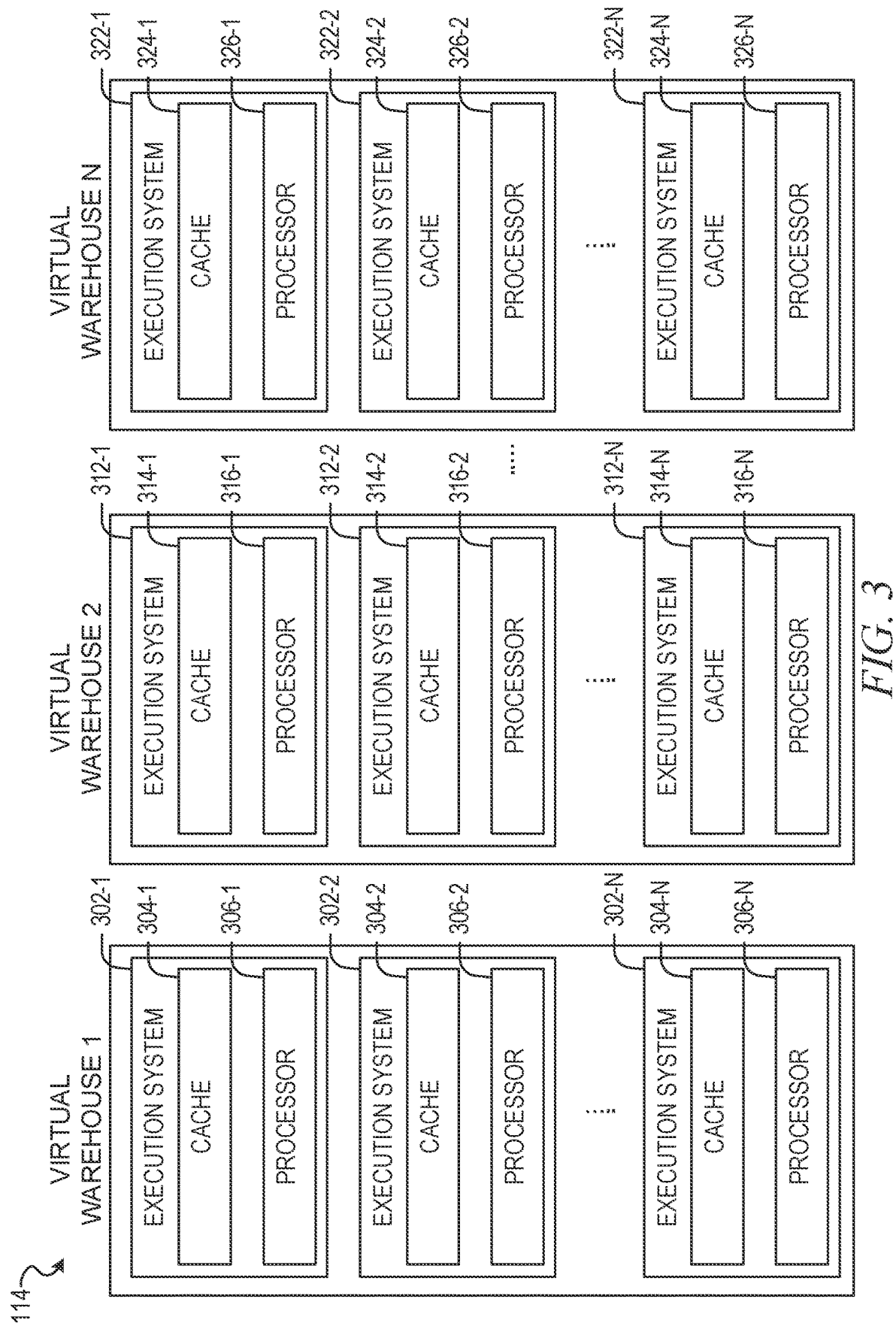
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-*n* shown in FIG. 1. Thus, the virtual warehouses are not necessarily assigned to a specific data storage device 124-1 to 124-*n* and, instead, can access data from any of the data storage devices 124-1 to 124-*n* within the cloud computing storage platform 104. Similarly, each of the execution nodes shown in FIG. 3 can access data from any of the data storage devices 124-1 to 124-*n*. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-*n*. Execution node 302-1 includes a cache 304-1 and a processor 306-1. Execution node 302-2 includes a cache 304-2 and a processor 306-2. Execution node 302-*n* includes a cache 304-*n* and a processor 306-*n*. Each execution node 302-1, 302-2, and 302-*n* is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-*n*. Execution node 312-1 includes a cache 314-1 and a processor 316-1. Execution node 312-2 includes a cache 314-2 and a processor 316-2. Execution node 312-*n* includes a cache 314-*n* and a processor 316-*n*. Additionally, virtual warehouse 3 includes three execution nodes 322-1, 322-2, and 322-*n*. Execution node 322-1 includes a cache 324-1 and a processor 326-1. Execution node 322-2 includes a cache 324-2 and a processor 326-2. Execution node 322-*n* includes a cache 324-*n* and a processor 326-*n*.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns useful for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that make use of significant computing resources. Another execution node may contain significant cache resources and minimal computing resources, making this execution node useful for tasks that may use caching of large amounts of data. Yet another execution node may contain cache resources providing faster input-output operations, useful for tasks that make use of fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node may use a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
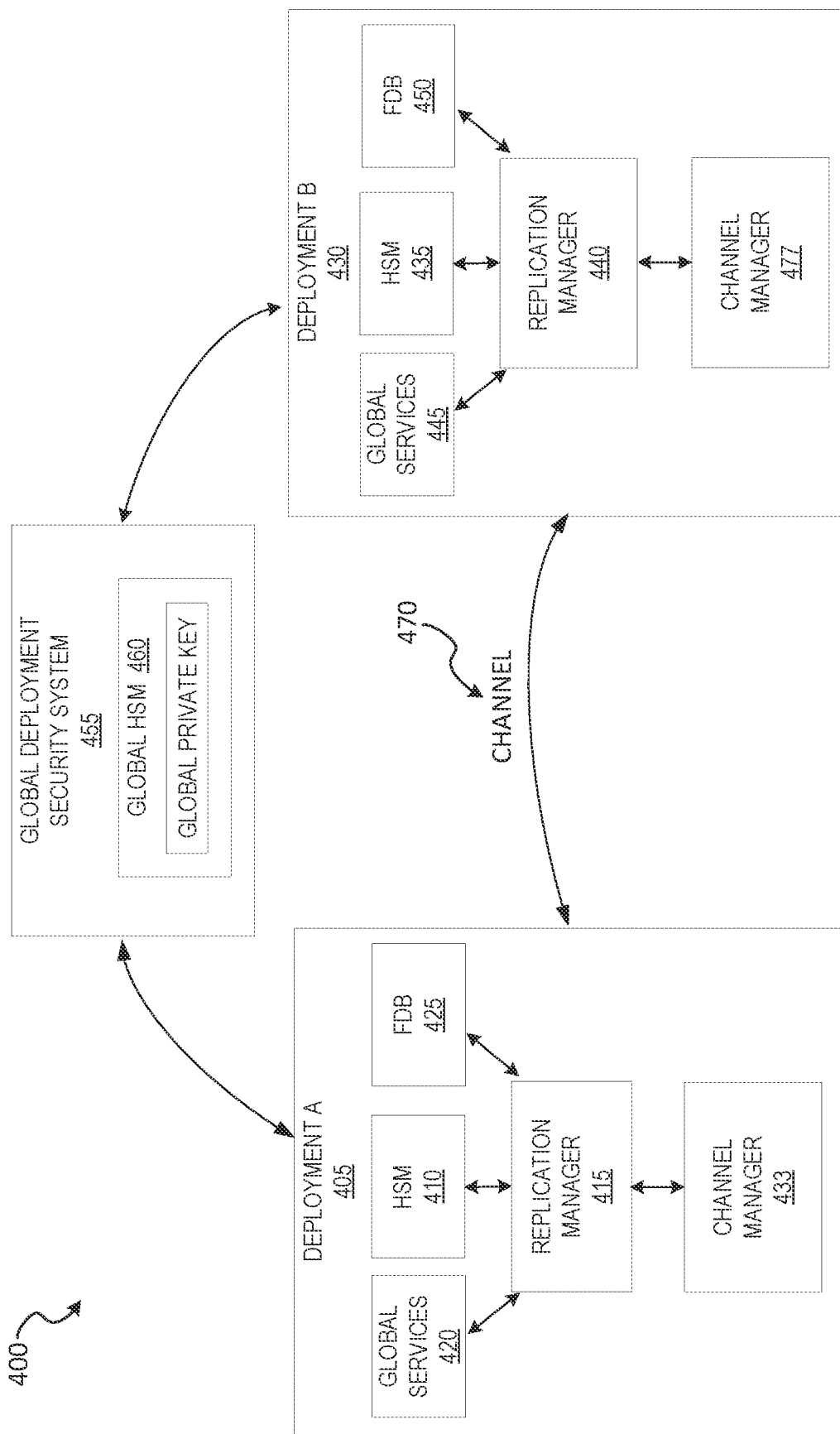
FIG. 4 shows an example database architecture for transmission of database data over a channel (e.g., private channel), according to some example embodiments.

FIG. 4 shows an example database architecture 400 for transmission of database data over a channel (e.g., private channel), according to some example embodiments. As discussed above, an HSM is a hardware security module, which is a physical computing device that safeguards and manages digital keys for strong authentication. Example HSMs can be implemented as a plug-in card or server rack module that attaches directly to a computer or network service running within the deployment's cloud execution instances (e.g., within the VPN of the cloud platform, such as AWS). In some example embodiments, a given deployment's HSM is provided by the cloud provider as a network service, along with the provided execution units (e.g., Amazon S3, Google Cloud, Microsoft Azure each offer HSM services for their cloud compute units, e.g., virtual machines).

In some example embodiments, the encryption keys are generated and managed by the HSMs in each deployment. As discussed above, if two deployments are being connected (e.g., a mesh of deployments), this can make use of exporting encryption keys (e.g., symmetric key, private keys, public key, key pairs) out of one deployment's HSM and importing the key data into another deployment's HSM (e.g., a new deployment that is being added to the mesh). For example, to safeguard data, an existing deployment can be replicated, wherein a new deployment is created, the data from the existing deployment is copied or otherwise replicated over to the new deployment, the existing deployment's HSM exports the key, and the new deployment's HSM imports the key. After creation and exporting/importing of the key, the new deployment can function as a secondary or replication deployment that stores data replicated from the existing deployment, which then functions as a "primary" or source deployment. While HSMs provide secure encryption functions, HSM processing does not scale well and can increase the processing overhead as more deployments are added to a given networked system. Thus, there is an existing demand for using non-HSM operations where possible, so long as the non-HSM processing can be performed securely.

Furthermore, not all HSMs provide key importing or exporting functions, which inhibits replication of deployments using such systems.

One approach to handling HSM scaling issues involves creating a public key document that stores each deployment's public key, where new deployments add their public key to the public key document and encrypt outbound messages with the target deployment's public key (which is then decryptable by the target deployment via its private key). However, one issue with this approach is that it can be difficult to manage the public key document in a secure manner, as the number of deployments scale to enterprise levels.

Additionally, even if a given deployment knows the target deployment's public key, that does not ensure that the target deployment is who it says it is. That is, for example, the target deployment may be a compromised or otherwise malicious deployment that is seeking to intercept data by proffering the compromised/malicious deployment's public key to other legitimate deployments in the mesh. Additionally, it is impractical to perform key rotation using the public key document (where key rotation is when each public key is replaced with a new public key), at least in part because each deployment would rotate their keys at the same time, which is difficult to do in practice and can be prone to errors.

To solve these issues, the replication manager 225 can implement asymmetric keys and one or more symmetric keys to transmit data between databases, such as a source deployment (e.g., a primary database application in a VPN) and a target deployment (e.g., one or more secondary or replicated databases in another VPN cloud). In some example embodiments, each deployment generates a replication asymmetric keypair (RAK) to send and receive encrypted data, and an authentication asymmetric keypair (AAK) that is used to authenticate the given deployment. In some example embodiments, each deployment further generates a symmetric key to encrypt/decrypt each data file sent (e.g., data encryption key (DEK)), and a symmetric wrapping replication key (WRK) which wraps the DEKs, where the WRKs can be staggered across messages and constantly changed to further secure the sent data. The replication manager can use these keys in an authentication process and messaging protocol to securely send and receive data between the deployments without reliance on importing/exporting of keys from the HSMs.

Generally, an example asymmetric keypair includes PKI (Public Key Infrastructure) keys comprising a private key and a corresponding public key. The PKI keys are generated by the HSMs using cryptographic algorithms based on mathematical problems to produce one-way functions.

The keypair can be used to securely send data and also to authenticate a given device. To securely send/receive data using an asymmetric keypair, the public key can be disseminated widely, and the private key is kept private to that deployment. In such a system, any sending deployment can encrypt a message using the target deployments' public key, but that encrypted message can only be decrypted with that target deployment's private key.

To use a keypair as a signature or authentication mechanism, a signing device uses the private key to "sign" a given data item, and other devices that have access to the public key can authenticate that the signature on the data item is authentic because only the signing device has the private key, and in such systems forging the signature is currently mathematically impractical.

Generally, a symmetric key is a shared secret that is shared between the transmitter and receiver, where the shared secret (e.g., the symmetric key) is used to encrypt the message and also to decrypt the message. An example symmetric key scheme includes Advanced Encryption Standard (AES) 256, which can be generated by the HSM; additional symmetric key schemes include Twofish, Blowfish, Serpent, DES, and others.

In the example illustrated in FIG. 4, deployment_A 405 and deployment_B 430 are separate instances of shared data processing platform 100 of FIG. 1 with various components discussed in FIGS. 1-3 omitted for clarity. That is, for example, deployment_A is a first instance of shared data processing platform 100 installed within a first VPC at a first geographic location (e.g., AWS virtual private cloud hosted in San Francisco), and deployment_B is a second difference instance of shared data processing platform 100 installed and hosted within a second VPC at a second geographic location (e.g., a different AWS virtual private cloud hosted from New York City). Although only two deployments are discussed here as an example, it is appreciated that each location may implement multiple deployments within the same VPC or other VPCs. For example, the VPC that is hosting deployment_A 405 may have other deployments each running their own instances of shared data processing platform 100. Further, although there the deployments are discussed as being geographically separated, it is appreciated that the deployments may be located within the same geographic region, albeit on different cloud systems (e.g., deployment_A 405 is a west coast AWS VPN instance of shared data processing platform 100 and deployment_B 430 a Google Cloud instance of shared data processing platform 100) or different subnets of a single cloud site at the same geographic location (e.g., both deployments are on a west coast AWS virtual private cloud but on different partitioned subnets).

In the illustrated example, deployment_A 405 includes a replication manager 415 that manages authentication of the deployment with other deployments (e.g., deployment_B 430 and/or other deployments in a mesh with deployment_A 405 and deployment_B 430). The deployment_A 405 further comprises global services 420, which is a consolidated or representative sub-system including instances of 202, 204, 206, 208, 210, 212, and 214 displayed in FIG. 2. The deployment_A 405 further includes Foundation Database 425 (FoundationDB, "FDB") which is another representative sub-system including instances of 216, 218, and 220.

The deployment_A 405 further includes HSM 410, which, as discussed, is a hardware security module that can generate and manage encryption keys for the deployment_A 405. Further, deployment_A includes channel manager 433 that manages transmission of data to and from other deployments over a channel 470, as discussed in further detail below with reference to FIGS. 6-8.

Deployment_B 430 is an example deployment of shared data processing platform 100 located at a second geographic location (e.g., New York City). As illustrated, deployment_B 430 includes a replication manager 440 that manages authentication of the deployment with other deployments (e.g., deployment_A 405 and/or other deployments in a mesh with deployment_A 405 and deployment_B 430). The deployment_B 430 further comprises global services 445, which is a consolidated or representative sub-system including instances of 202, 204, 206, 208, 210, 212, and 214 displayed in FIG. 2. The deployment_B 430 further includes FDB 450 which is another comprised or representative sub-system including instances of 216, 218, and 220. Further, deployment_B 430 includes channel manager 477 that manages transmission of data to and from other deployments over the channel 470 (e.g., via one or more hosted connection to a private network), according to some example embodiments.

The database architecture 400 further includes global deployment security system 455, according to some example embodiments. As illustrated, the global deployment security system 455 includes a global HSM 460 which generates an asymmetric keypair, including a global public key and a global private key. The global public key is widely distributed (e.g., to all deployments in the mesh) and can be used by the deployments to check whether an item of data (e.g., a public key of an unknown deployment) was actually signed by the global signing key of global deployment security system 455 (e.g., using PKI signing operations discussed above).

In the following example, deployment_A 405 is the primary database and seeks to send replication traffic to deployment_B 430, though it is appreciated that in reverse processes, the architecture 400 can be implemented to send traffic from deployment_B 430 to deployment_A 405.

In some example embodiments, to authenticate the deployment_A 405, the global deployment security system 455 signs the authentication public key of the deployment_A 405 with the global signing key, thereby indicating to other deployments that the deployment_A 405 is who it says it is (e.g., that is, an authenticated deployment and not a malicious or compromised deployment).

In some example embodiments, to initiate channel 470, deployment_A 405 sends deployment_B 430 the authentication public key of deployment_A 405, which has been signed by the global signing key of global deployment security system 455. In some example embodiments, the setup communications are sent over the VPN nodes, while in other embodiments the setup communications are transmitted to destination deployments over the Internet (e.g., encrypted traffic), where the setup communications can include key or authentication data that is not replication data, according to some example embodiments.

Deployment_B 430 the receives the key data, and if the key is not signed by the global deployment security system 455, the deployment_B 430 rejects further communications from the deployment_A 405. Assuming the received public key is signed by the global deployment security system 455, the deployment_B 430 saves network address data (e.g., URLs) and other data describing deployment_A 405 (e.g., tasks/functions) for further communications.

In some example embodiments, after channel 470 is established, the deployment_A 405 can send encrypted data to deployment_B 430, such as replication files from one or more of deployment_A's databases (e.g., data storage devices 124 connected to the execution units of deployment_A 405). As discussed in further detail below with reference to FIG. 6-8, the messages of channel 470 are transmitted by way of one or more nodes or networked servers of a virtual private network.

In some example embodiments, to encrypt and decrypt the data sent over the channel 470, HSM 410 generates a replication asymmetric key pair for deployment_A 405, and HSM 435 generates a replication asymmetric key pair for deployment_B 430, where the public keys from of each deployment can be widely spread and used to encrypt data sent to the destination deployment.

For example, deployment_A 405 can send a data file encrypted with the public key of deployment_B 430, so that only deployment_B 430 can decrypt the file. Further, each data message may initially be encrypted using a data encryption key (DEK) and further encrypted using a wrapping replication key (e.g., a symmetric key different than the DEK), which can be included in the files sent to the destination deployment, e.g., deployment_B 430.

Although in the above examples, two different asymmetric key pairs were generated for deployment_A—one for authentication and one for the sending of database data—in some example embodiments a single asymmetric keypair is used to both authenticate the deployment and send the encrypted data. For example, a keypair can be generated for deployment_A 405 and the public key of the keypair can be signed by the global private key from the global deployment security system 455. After the public key pair is signed, the deployment_A 405 can send the signed public key to deployment_B 430 to both authenticate deployment_A 405 and to later send traffic to deployment_A 405. That is, for example, deployment_B 430 receives the signed public key and knows that it can trust deployment_A 405 because the public key is a signed global private key, which only global deployment security system 455 has access to (e.g., as managed by global HSM 460). Further, the deployment_B 430 can use the signed public key to encrypt and send data back to deployment_A 405, where it is guaranteed that only deployment_A 405 can decrypt the data as only deployment_A 405 has the corresponding private key. In this way, and in accordance with some example embodiments, a single asymmetric keypair is used to both authenticate and send data to a given deployment.

Figure 5:
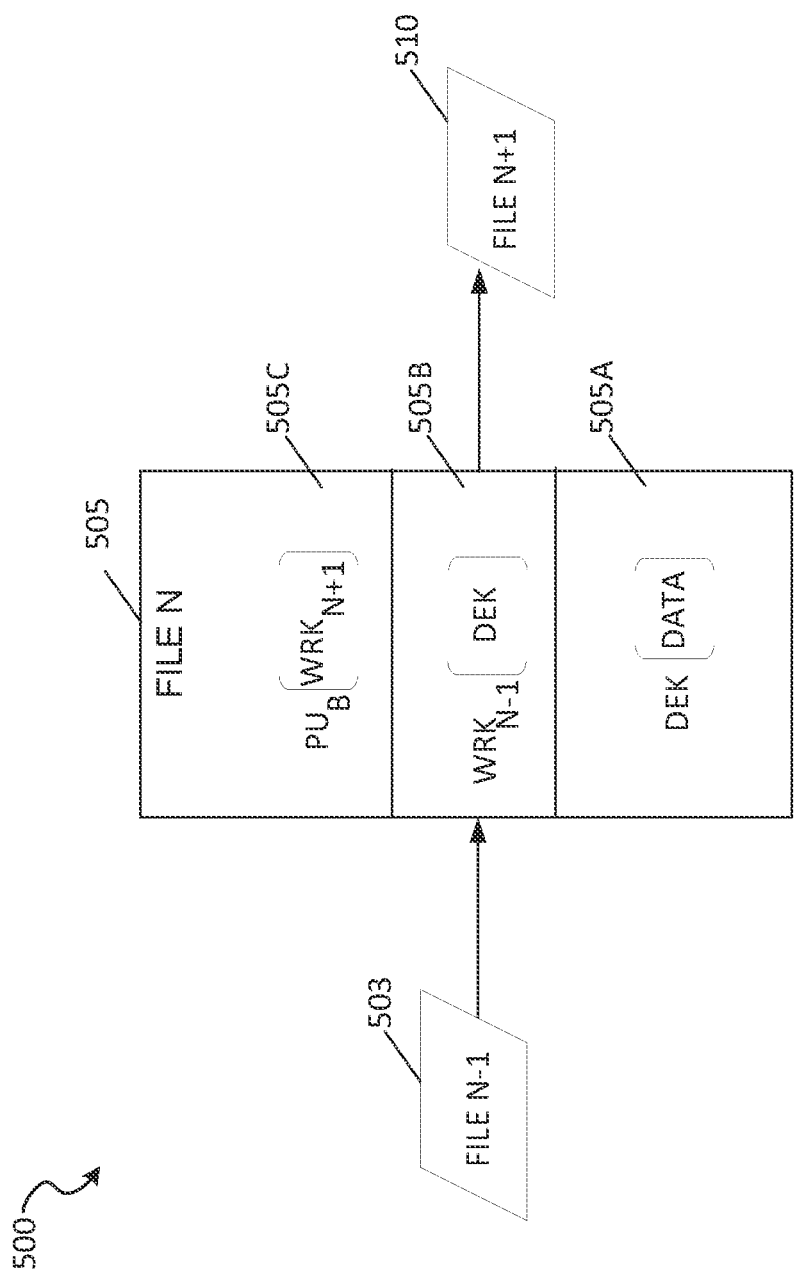
FIG. 5 is a diagram showing an example messaging structure for data transmission between deployments over a channel, according to some example embodiments.

FIG. 5 shows an example messaging structure 500 for data transmission between deployments over a channel, according to some example embodiments. In the example of FIG. 5, the WRKs are staggered to increase security of the files sent between the deployments. In the following description, "−1" denotes a previous item, such as previously sent file or a WRK key previously sent, and "+1" denotes a subsequent item, such as a file that is created and is to be sent after the initial or previous file In the example, the messaging structure 500 can be a stream of replication database items sent from deployment_A 405 to deployment_B 430. As an example, file 503 is the first database data item that is generated and then sent to the destination, which is followed by file 505, which is created and then sent to the destination, which is followed by file 510, which is the last file in the example of FIG. 5 to be generated and sent to the destination (e.g., deployment_B 430, a server, virtual machine, etc.). At a high level, each file is staggered in that the data encrypted in the file is accessed through an encryption key that is sent in another file, such as the previously sent file. For example, file 503 specifies the WRK that is to be used to access the data in file 505, and file 505 species the WRK (e.g., in part 505C) to be used to access the data in file 510, and so on. When the destination device receives file 503, it stores WRK in file 503 for use in decrypting the file in the next file, i.e., file 505, and so on.

In particular, and in accordance with some example embodiments, as illustrated in file 505, the file structure can include bytes (e.g., byte stream) that can correspond to different parts of the file 505 including part 505A, part 505B, and part 505C.

In some example embodiments, part 505A and part 505B correspond to the message or file's body and store the replication data (e.g., "data" in part 505A, such as database values) as well as staggered WRK data (e.g., the WRK key for the next file), and part 505C is part of a file's header structure. In other example embodiments, each of the parts 505A-C is part of the message body, and the header stores ID data for which WRK key and public key to use for that message in identifying correct keys after key rotations.

In the messaging structure 500, the data for each file is encrypted by a DEK. For example, as illustrated in part 505A, the data has been encrypted by a DEK for that file 505. In some example embodiments, the data of each file send is encrypted by a different DEK. That is, for example, data in the previous file 503 is decrypted by a different DEK, and data in the subsequent file 510 is decrypted in a different DEK and each file encrypted using a unique DEK.

As illustrated in part 505B, the DEK of file 505 is encrypted by a WRK which was received in the previous file 503. That is, the WRK used to encrypt the DEK in file 505 was previously received in the file 503. As illustrated in part 505C, the WRK for the next file ("WRK+1"), file 510 ("file N+1"), is encrypted by the public key of the destination deployment, such as deployment_B 430. In some example embodiments, the encrypted WRK is cached in one or more sending deployments so that one or more messages to be sent to the destination deployment can use the cached encrypted WRK.

Accordingly, the WRKs are staggered and the WRK included in a given file is the WRK for the next file to be received. In this way, if the file 505 is maliciously intercepted, the DEK for that file cannot be accessed because the DEK is encrypted with a WRK that was sent in a previous message (e.g., file 503).

As an example, upon receiving file 503, the destination deployment uses its private key to access the next file, which is file 505. When the destination deployment receives file 505, it accesses the DEK in part 505B using the previously stored WRK from file 503, and then uses the DEK to access the data of file 505 (e.g., in part 505A).

In some example embodiments, each WRK is stored inside the message and is used to access the data (e.g., the DEK to access the data) for that given message. That is, for example, whereas in the illustrated example of FIG. 5, each WRK is for another messages DEK, in some example embodiments, a given message's DEK is encrypted by a WRK and then that WRK is encrypted by the public key and included in that message so that each message includes the symmetric keys for accessing the data in that given message. For example, upon receiving the message, the destination deployment uses its private key to decrypt the WRK in the message, and then uses that newly unencrypted WRK to decrypt the DEK in that same message, and then finally access the data using DEK decryption. Additionally, in some example embodiments, the WRK is changed or regenerated by the HSM of the sending deployment periodically or in in response to event triggers. For example, the WRK may be regenerated by the HSM of the sending deployment every fifteen minutes or hour, where the new newly generated WRK is received by the destination deployment in the messages themselves (e.g., a new message includes the new WRK, which will be used for the next received messages for the next time period until a new WRK is generated).

Figure 6:
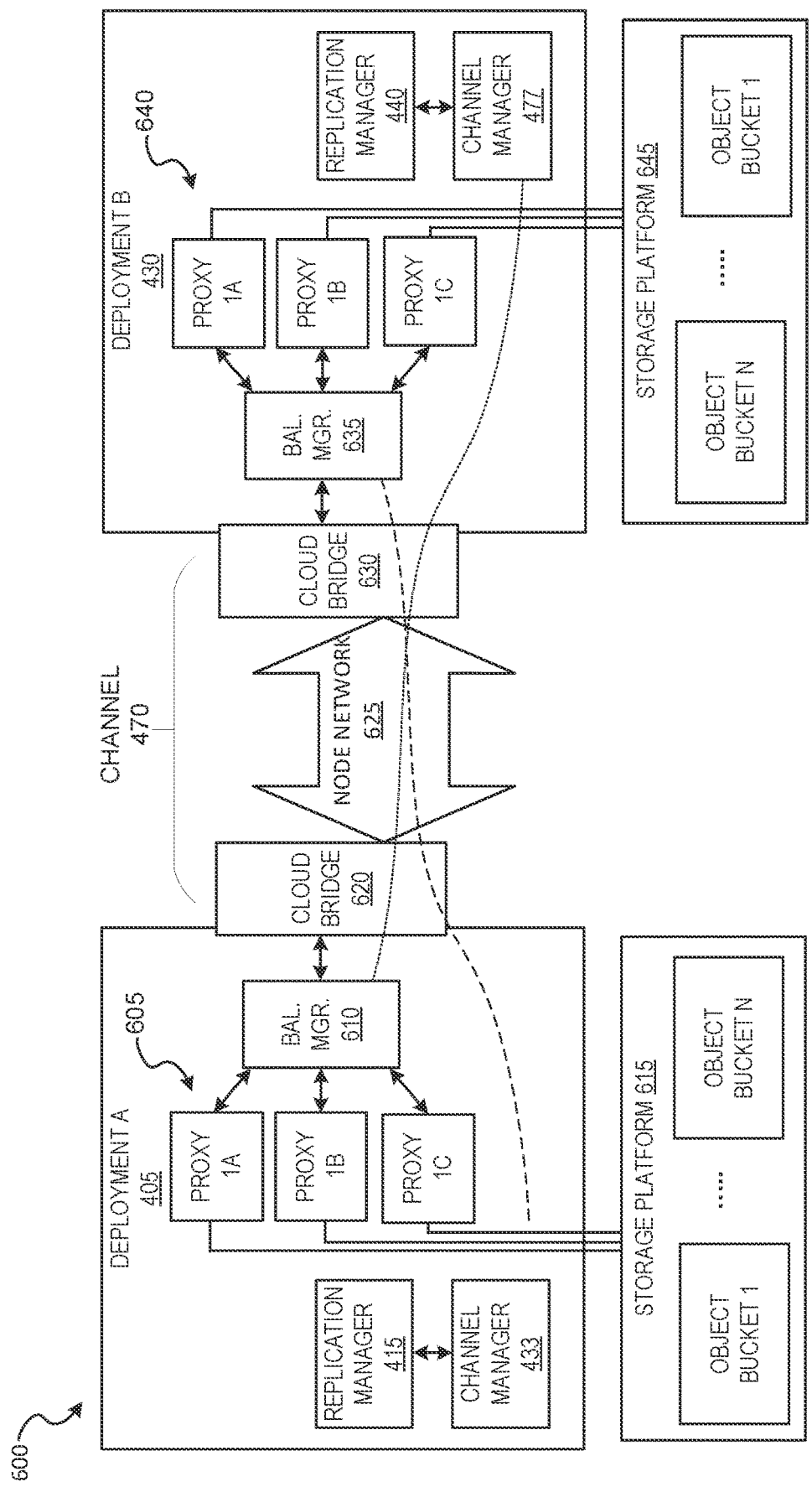
FIG. 6 is a diagram showing an example channel architecture for transmitting data between databases, according to some example embodiments.

FIG. 6 shows an example channel architecture 600 for transmitting data between databases, according to some example embodiments. In the illustrated example, different components are displayed within deployment_A 405 and deployment_B 430, in addition to example storage components, including storage platform 615 and storage platform 645 in accordance with some example embodiments.

In addition to replication manager 415 and channel manager 433, deployment_A 405 includes proxy servers 605 which receive traffic distributed from network traffic load balancer manager 610 (e.g., an AWS elastic load balancer). In some example embodiments, the balancer manager 610 is interfaced with a cloud bridge 620 for sending and receiving traffic out of the deployment's cloud, e.g., to a private or otherwise external network. For example, if deployment_A 405 is hosted from an AWS virtual private cloud (e.g., AWS VPC subnet) the cloud bridge 620 can be a plurality of hosted connections from AWS that connect to a private network (e.g., AWS Direct Connect, with hosted connections provisioned by AWS or a service provider of AWS).

In the illustrated example, the channel 470 comprises a virtual private network of nodes in node network 625. For example, the virtual private network can include a plurality of enterprise nodes of an enterprise provided virtual private network, such as AT&T NetBond. As an additional example, the node network 625 can include a plurality of servers configured as part of a single virtual private network (e.g., a server at a house in San Francisco and another server at another house in New York City, where the servers are connected as nodes of a single virtual private network). The traffic is then transmitted over the virtual private network using node network 625 to cloud bridge 630, which is a private network connection (e.g., Direct Connect, Azure Express Route) provided by the VPC provider of deployment_B 430 (e.g., AWS, Azure, GPC). The traffic received by the cloud bridge 630 is then distributed to the proxy servers 640 of deployment_B 430 using balancer manager 635 which is load balancer, such as AWS elastic load balancer, which then process and store the data in storage platform 645.

Figure 7:
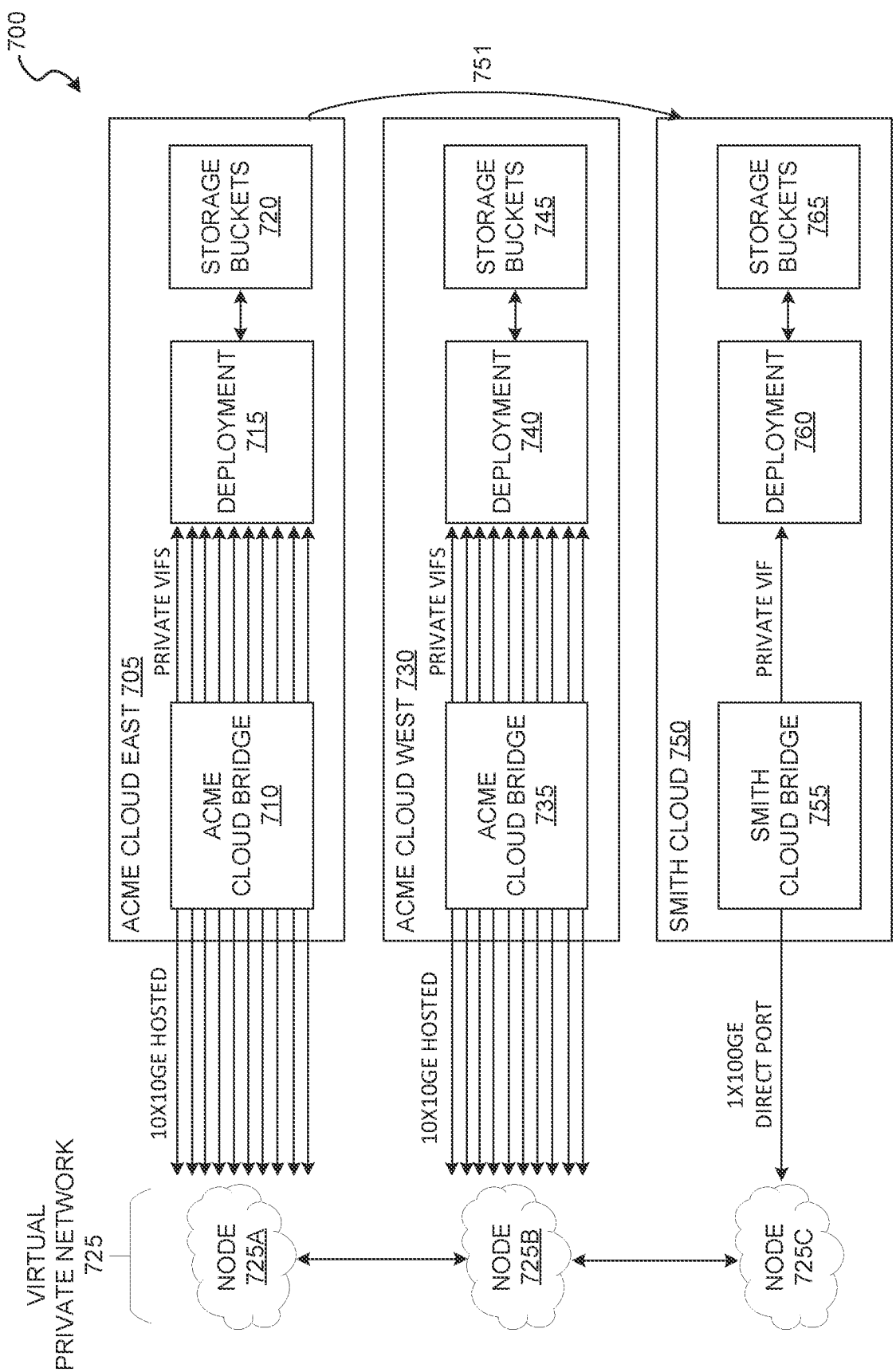
FIG. 7 is a diagram showing an example network architecture for transmission of data between database deployments, according to some example embodiments.

FIG. 7 shows an example network architecture 700 for transmission of data between database deployments, according to some example embodiments. As illustrated, architecture includes three virtual private clouds, including ACME cloud east 705 and ACE cloud west 730, which are different clouds of a same VPC provider (e.g., AWS), and further including smith cloud which is a virtual private cloud of a different provider (e.g., Azure). ACME cloud east 705 is a virtual private cloud that hosts deployment 715 (e.g., an example instance of shared data processing platform 100), which stores data in storage buckets 720 (e.g., example instance of data storage device 124) and connects to a virtual private network 725 of nodes 725A, 725B, and 725C by way of ACME cloud bridge 710.

ACME cloud west 730 is another virtual private cloud that hosts deployment 740 (e.g., another example instance of shared data processing platform 100), which stores data in storage buckets 745 (e.g., example instance of data storage device 124) and connects to the virtual private network 725 of nodes 725A, 725B, and 725C by way of ACME cloud bridge 735.

Smith cloud is a different virtual private cloud (e.g., from a different provider using different cloud architecture) that hosts deployment 760 (e.g., another additional instance of shared data processing platform 100), which stores data in storage buckets 765 (e.g., example instance of data storage device 124) and connects to the virtual private network 725 of nodes 725A, 725B, and 725C by way of ACME cloud bridge 755.

As discussed above, sending and receiving data (e.g., replication data) between the deployments 715, 740, 760 can be difficult for different reasons including lack of certainty in the transmission path(s), egress fees, and security module restrictions. To address the issues, nodes 725A-725C of a virtual private network 725 can be configured at different geographic locations to transmit data over the virtual private network 725.

In some example embodiments, which data sent through the virtual private network 725 is configured using shared tuple metadata managed by the channel manager in each deployment, where each data keeps a complete shared record of the tuple data. For example, the channel manager in deployment 715 (not depicted in FIG. 7) may store one or more tuples for when traffic is to be sent through the nodes 725A-725C. The tuple metadata can include a first value of the sending deployment and a second value specifying the destination deployment, e.g., [deployment 715, deployment 740], where if traffic is sent to the destination deployment then it is proxied over the virtual private network using nodes 725A and 725B (via hosted connections of the respective cloud bridges 710 and 735, each of which interface using hosted connections to the nodes (e.g., "10×10GE HOSTED") and private virtual interfaces ("private VIFS") that connect to respective deployments.

In some example embodiments, the tuple metadata specifying which traffic is sent through the nodes 725A-725C can be configured at the account level, deployment level, VPC level, or specific external addresses of networks outside the VPCs. For example, if the tuple metadata can specify that replication traffic from a data share of a specific user account that is replicated to any database managed deployment 740, e.g., [account_1, deployment 740]. In this example embodiment, if the traffic is from account_1 and being sent to deployment 740 it is sent over the virtual private network as encrypted messages (e.g., staggered WRK messages).

As an additional example, if the tuple metadata is: [deployment 715, account123] (where account123 is running within deployment 760), then any traffic from deployment 715 to a specific user account ("account123") of deployment 760 should be sent via the nodes 725A-725B, but other traffic not sent to the specific account. For instance, if a primary database shares data with account123 in deployment 715, then the traffic is proxied over the private network 725; whereas if the same primary database send traffic to another account, e.g., account456 in deployment 760) or to server 777 in cloud 750, then the traffic may be sent over an open Internet path 751 (e.g., encrypted Internet traffic).

Figure 8:
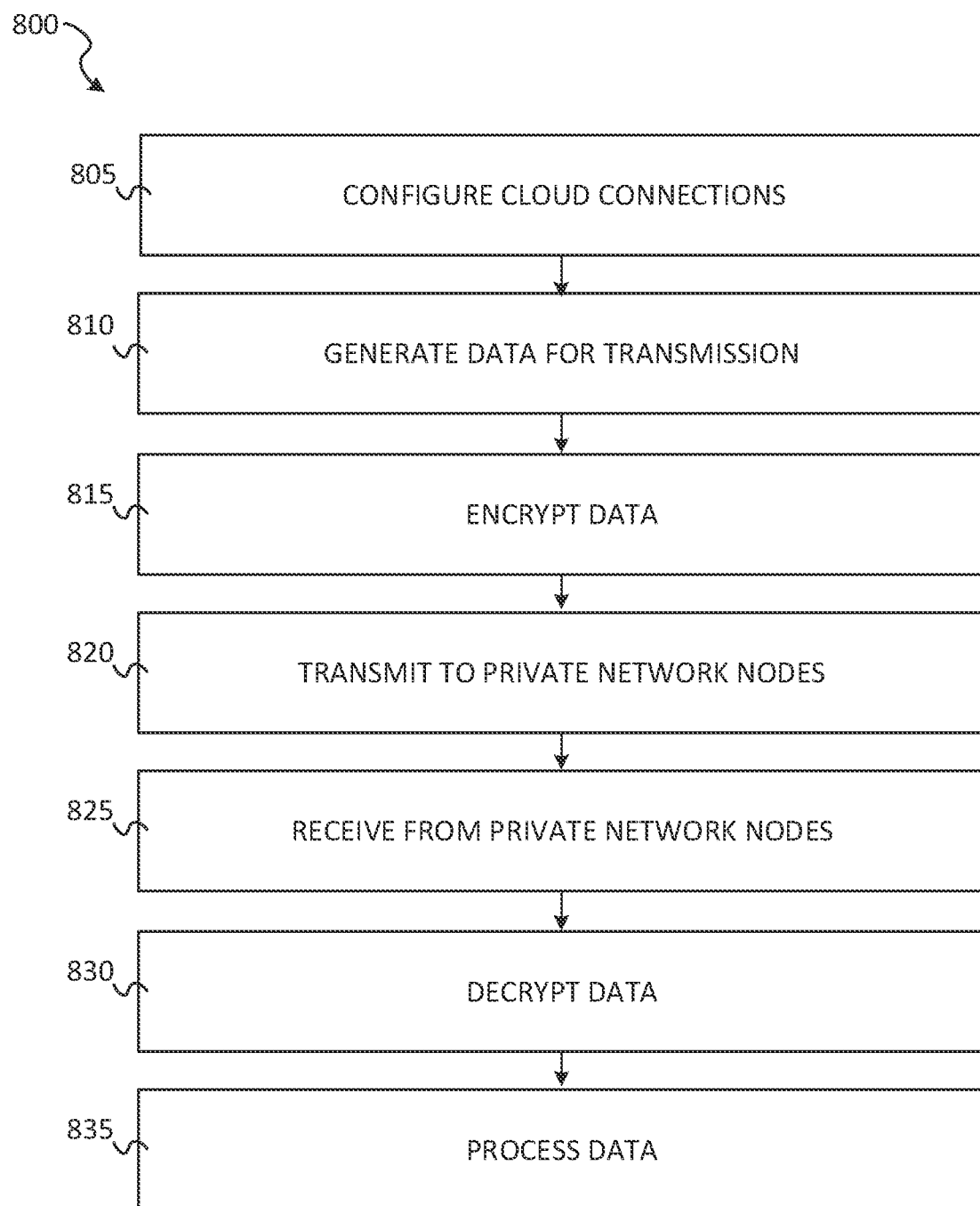
FIG. 8 shows a flow diagram of a method for transmission of data as channel messages sent between deployments, according to some example embodiments.

FIG. 8 shows a flow diagram of a method 800 for transmission of data as channel messages sent between deployments, according to some example embodiments. At operation 805, the channel manager 433 configures cloud connections of a virtual private cloud that is hosting a deployment database system (e.g. deployment_A 405). For example, at operation 805, one or more hosted connections of a cloud bridge 620 (e.g., AWS Direct Connect) are exposed and interfaced with the channel manager 433. Additionally, and in accordance with some example embodiments, at operation 805, additional channel managers in other deployments are configured to connect to the virtual private network through their respective cloud bridges (e.g., AWS Direct Connect, Azure Express Route, Ethernet).

At operation 810, the replication manager 415 generates or otherwise identifies data for transmission. For example, the replication manager 415 in deployment_A 405 identifies data from a primary database hosted from deployment_A 405 to be replicated to another database, such as a database running within deployment_B 430.

At operation 815, the replication manager 415 encrypts the data for transmission. For example, the replication manager 415 encrypts the data as a sequence of messages to be transmitted to the replication database, as discussed above. For instance, the data in each message can be encrypted by a DEK for that message, which the message's DEK is then encrypted by a WRK, which is then stored in another message in encrypted form (e.g., encrypted by the public key of the destination deployment, and then included in a subsequent message).

At operation 820, the channel manager 433 transmits the data to private network nodes. For example, at operation 820, the channel manager 433 sends the encrypted data using one or more private virtual interfaces (private VIFs) to the cloud bridge 620 to send the data to a private network node (e.g., NetBond nodes) of a node network, such as node network 625. Once the private node network 625 receives the data, the nodes transmit the data across the network to the destination node, such as the node that is nearest to the destination deployment (e.g., in the same geographic area).

At operation 825, channel manager 477 of the destination deployment (deployment_B 430) receives the data from the private network nodes. For example, the channel manager 477 receives the data through cloud bridge 630 using a hosted connection that imports data from the virtual private network.

At operation 830, the replication manager 440 of the destination deployment (deployment_B 430) decrypts the data. For example, at operation 830, the replication manager 440 receives a given message and decrypts the WRK in the message using the public key of the destination deployment, and then stores the decrypted WRK for use in decrypting data in the next received message. Upon receiving the next message, the replication manager 440 retrieves the stored WRK to decrypt the DEK in that next message, and then uses the newly encrypted DEK to decrypt the data in that given message, according to some example embodiments.

At operation 835, replication manager 440 processes the decrypted data. For example, at operation 835, the replication manager 440 transmits the data to global services 445 running within the deployment (other modules within a compute service manager 112, FIG. 2) for further processing and storage.

Figure 9:
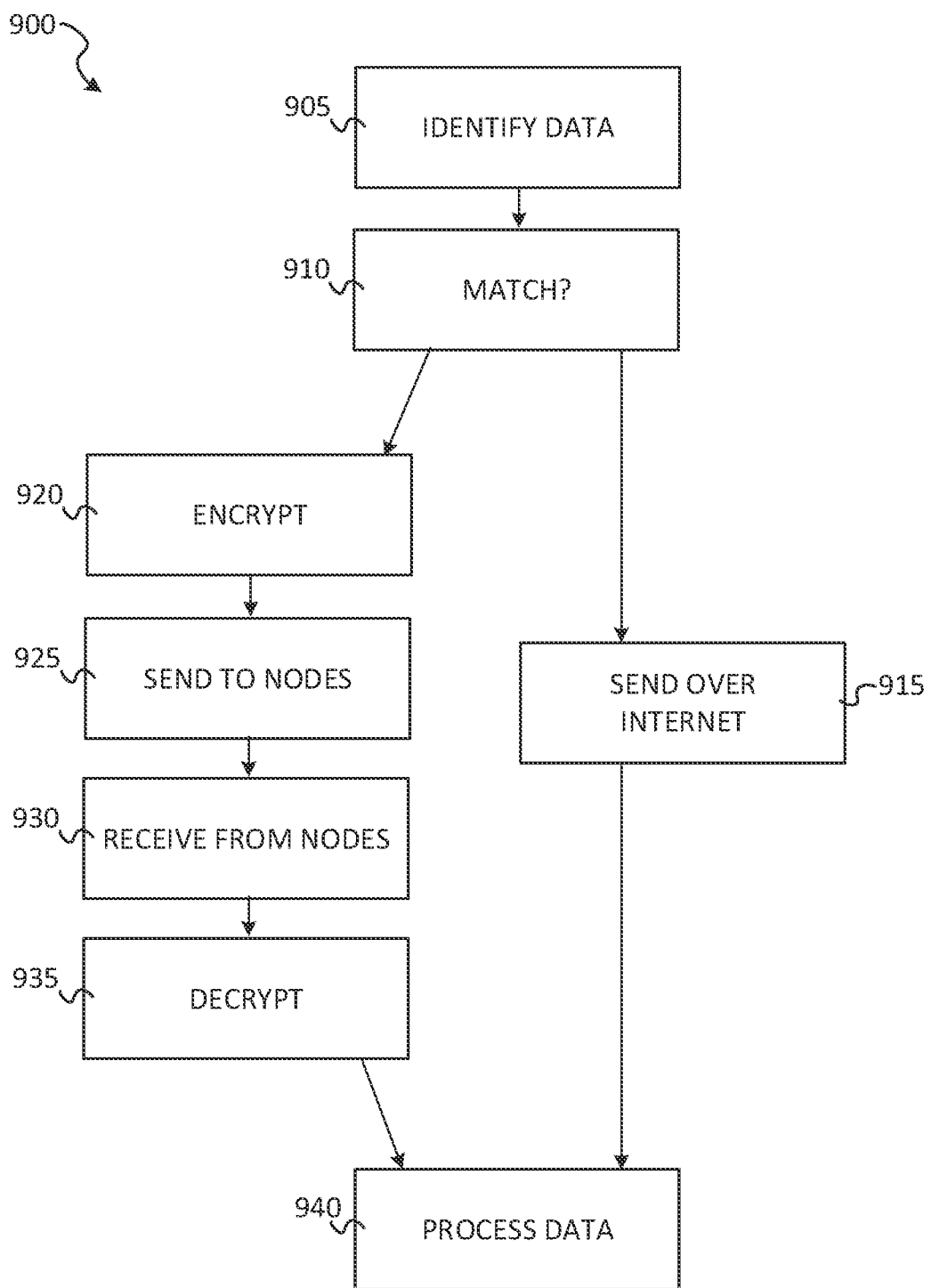
FIG. 9 shows an example flow diagram of a method for transmitting data between deployments using metadata, according to some example embodiments.

FIG. 9 shows an example flow diagram of a method 900 for transmitting data between deployments using metadata, according to some example embodiments. At operation 905, the replication manager 415 identifies data for transmission. For example, the data may be replication data for transmission to one or more replication databases, or may be non-replication data for storage in another deployment, according to some example embodiments.

At operation 910, the channel manager 433 accesses tuple metadata (e.g. stored within configuration and metadata manager 216 and data storage device 220, FIG. 2) to determine whether the data matches a tuple for transmission through the virtual private network. For example, given tuple may specify that any data from deployment_A 405 that is sent to deployment_B 430 should be encrypted as a sequence of messages and send through private node network for storage and processing by deployment_B 430. Assuming at operation 910, that the channel manager 433 determines that the data does not satisfy the tuple (e.g., the sending parameter in the destination parameter do not match the metadata of the data for transmission) then the data is sent over non-node mechanisms at operation 915, such as the Internet, and is then further processed at operation 940 (e.g., processed by global services 445, FIG. 4)

In contrast, if the data for transmission does match the tuple metadata at operation 910, then the method 900 proceeds to operations 922-935. In particular, for example, at operation 920, the replication manager 415 encrypts the data for transmission to the destination as a sequence of messages (e.g., sequence WRK messages). At operation 925, the channel manager 433 uses a cloud bridge 620 that transmits data to the private node network 625 using a plurality of hosting connections (e.g., 10×10GE Hosted Connections).

At operation 930, on the destination deployment, the channel manager 477 receives the traffic from the node network 625 via the cloud bridge 630. At operation 935, the replication manager 440 decrypts the data, which is then processed at 940 by one or more modules of the destination deployment (e.g., global services 445).

Figure 10:
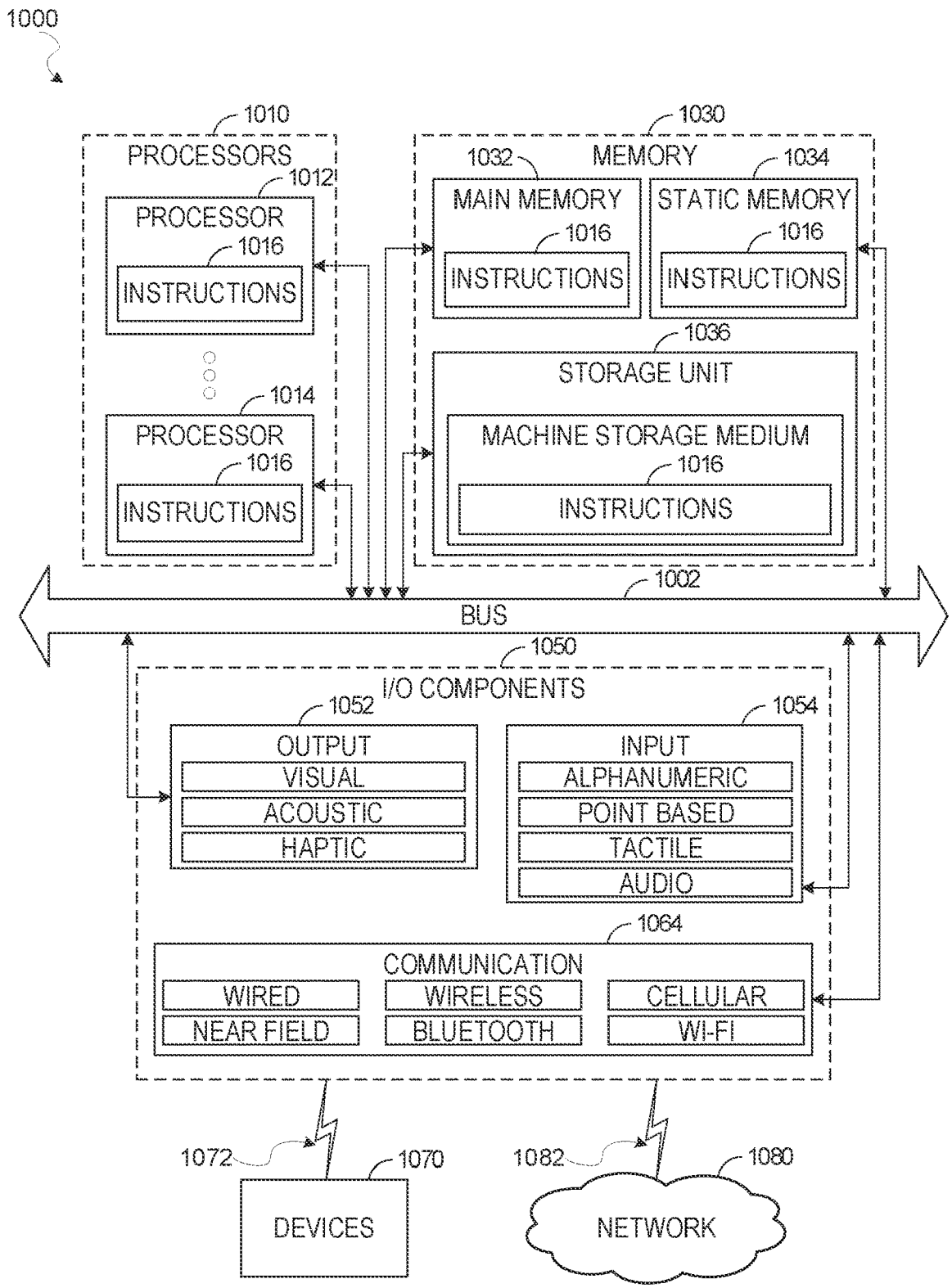
FIG. 10 illustrates a diagrammatic representation of a machine in the form of a computer system within which a set of instructions may be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute any one or more operations of any one or more of the methods 800 and 900. As another example, the instructions 1016 may cause the machine 1000 to implement portions of the data flows illustrated in any one or more of FIGS. 1-9. In this way, the instructions 1016 transform a general, non-programmed machine into a particular machine 1000 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)). For example, as noted above, the machine 1000 may correspond to any one of the remote computing device 106, the access management system 110, the compute service manager 112, the execution platform 114, the access management system 118, the Web proxy 120, and the devices 1070 may include any other of these systems and devices.

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 800 and 900 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

The following numbered examples are embodiments:

Example 1. A method comprising: identifying, by a first database deployment, a virtual private network comprising a plurality of virtual private network nodes, the virtual private network connected to a plurality of virtual private clouds including the first database deployment on a first virtual private cloud and a second database deployment on a second virtual private cloud; generating, by the first database deployment, database items to be replicated to the second database deployment; determining that the database items are for transmission to one or more proxy servers on the second virtual private cloud; in response to determining that the database items are for transmission to the second virtual private cloud, exporting, using a hosted connection of the first virtual private cloud, the database items to the virtual private network for transmission to the to the one or more proxy servers on the second virtual private cloud, the database items being transmitted to the second virtual private cloud using the plurality of using the virtual private network nodes of the virtual private network, the second database deployment receiving the database items from the virtual private network using another hosted connection that imports the database items to the second database deployment.

Example 2. The method of example 1, wherein the plurality of virtual private network nodes are located in different geographic locations comprising a first geographic region and a second geographic region.

Example 3. The method of any one or more of examples 1 or 2, wherein the first virtual private cloud is hosted by a first datacenter in the first geographic region and the second virtual private cloud is hosted by a second datacenter in the second geographic region.

Example 4. The method of any of one or more examples 1-3, wherein the database items are transmitted from the first virtual private cloud to the second virtual private cloud in a sequence of encrypted messages.

Example 5. The method of any one or more examples 1-4, wherein each encrypted message is encrypted by a changing symmetric key and a public key of the second database deployment.

Example 6. The method of any of one or more examples 1-5, wherein the changing symmetric key for each encrypted message is included in the encrypted message.

Example 7. The method of any of one or more examples 1-6, wherein the database items are directed to a network load balancer in the second virtual private cloud that distributes the database items to the one or more proxy servers in the second virtual private cloud.

Example 8. The method of any of one or more examples 1-7, wherein determining that the database items are addressed to one or more proxy servers on the second virtual private cloud comprises: identifying a pre-configured deployment tuple for proxying using the one or more proxy servers, the pre-configured deployment tuple comprising a sending database deployment and a destination database deployment.

Example 9. The method of any of one or more examples 1-8, wherein database items for replication are proxied to the one or more proxy servers by way of the virtual private network in response to determining that the first database deployment matches the sending database deployment and the second database deployment matches the destination database deployment in the pre-configured deployment tuple.

Example 10. The method of any of one or more examples 1-9, further comprising: generating, by the first database deployment, additional database items for transmission to a third database deployment that is external to the second virtual private cloud.

Example 11. The method of any of one or more examples 1-further comprising: determining that the third database deployment does not match the destination database deployment in the pre-configured deployment tuple.

Example 12. The method of any of one or more examples 1-11, further comprising: in response to the third database deployment not matching the destination database deployment in the pre-configured deployment tuple, transmitting the additional database items to the third database deployment without using the virtual private network nodes.

Example 13. The method of any of one or more examples 1-12, wherein the additional database items are transmitted to the third database deployment as encrypted messages on the Internet.

Example 14. The method of any of one or more examples 1-13, wherein the first virtual private cloud and the second virtual private cloud are different subnets of a virtual cloud network site.

Example 15. The method of any of one or more examples 1-14, wherein the first virtual private cloud is a private subnet of a virtual cloud network site and the second virtual private cloud is a private subnet of a different virtual cloud network site.

Example 16. A system comprising: one or more processors of a machine; and a memory storing instructions that, when executed by the one or more processors, cause the machine to perform operations implementing any one of example methods 1-15.

Example 17. A non-transitory machine-readable storage device embodying instructions that, when executed by a machine, cause the machine to perform operations implementing one of methods 1-15.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   selecting, by at least one hardware processor of a first database deployment, data for transmission to a second database deployment, the data comprising a plurality of files forming a data stream;
   encoding, by the at least one hardware processor, at least a first file of the plurality of files using a first encryption key, the first encryption key stored in at least a second file of the plurality of files;
   further encoding, by the at least one hardware processor, the at least a first file to include a second encryption key associated with at least a third file of the plurality of files;
   identifying, by the at least one hardware processor, a set of nodes in a virtual private network connected to the first database deployment and the second database deployment; and
   causing, by the at least one hardware processor, transmission of the data stream from the first database deployment to the second database deployment via the set of nodes of the virtual private network that is connected to the first database deployment and the second database deployment.

2. The method of claim 1, further comprising:
   causing transmission of the at least a second file prior to the at least a first file; and
   causing transmission of the at least a third file after the at least a first file.

3. The method of claim 1, wherein the first encryption key is a data encryption key, and the method further comprising:
   encoding the data encryption key using the first encryption key to generate an encrypted data encryption key.

4. The method of claim 3, further comprising:
   encoding the at least a first file to include the encrypted data encryption key.

5. The method of claim 1, further comprising:
   encoding the second encryption key using a public key of the second database deployment, to generate an encrypted second encryption key.

6. The method of claim 5, further comprising:
   encoding a header of the at least a first file to include the encrypted second encryption key; and
   encoding a payload of the at least a first file to include the second encryption key associated with the at least a third file of the plurality of files.

7. The method of claim 6, further comprising:
   encoding the header to further include first identification (ID) of the public key and a second ID of the second encryption key; and
   updating the first ID and the second ID based on detecting a key rotation at the first database deployment.

8. The method of claim 1, wherein the first encryption key is a data encryption key, and the method further comprising:
   encoding the data encryption key using the first encryption key to generate an encrypted data encryption key; and
   encoding the first encryption key using a public key of the second database deployment.

9. The method of claim 8, further comprising:
   encoding the at least a first file to include the encrypted data encryption key and the public key of the second database deployment before the transmission of the data stream.

10. The method of claim 1, further comprising:
    periodically regenerating the first encryption key and the second encryption key to generate an updated first encryption key and an updated second encryption key;
    encoding a configuration message for transmission to the second database deployment, the configuration message including the updated first encryption key and the updated second encryption key for decoding a subsequent transmission of the data stream.

11. A system comprising:
    one or more processors of a machine; and
    at least one memory storing instructions that, when executed by the one or more processors of a first database deployment, cause the machine to perform operations comprising:
      selecting data for transmission to a second database deployment, the data comprising a plurality of files forming a data stream;
      encoding at least a first file of the plurality of files using a first encryption key, the first encryption key stored in at least a second file of the plurality of files;
      further encoding the at least a first file to include a second encryption key associated with at least a third file of the plurality of files;
      identifying a set of nodes in a virtual private network connected to the first database deployment and the second database deployment; and
      causing transmission of the data stream from the first database deployment to the second database deployment via the set of nodes of the virtual private network that is connected to the first database deployment and the second database deployment.

12. The system of claim 11, the operations further comprising:
    causing transmission of the at least a second file prior to the at least a first file; and
    causing transmission of the at least a third file after the at least a first file.

13. The system of claim 11, wherein the first encryption key is a data encryption key, and the operations further comprising:
    encoding the data encryption key using the first encryption key to generate an encrypted data encryption key.

14. The system of claim 13, the operations further comprising:
    encoding the at least a first file to include the encrypted data encryption key.

15. The system of claim 11, the operations further comprising:
    encoding the second encryption key using a public key of the second database deployment, to generate an encrypted second encryption key.

16. The system of claim 15, the operations further comprising:
    encoding a header of the at least a first file to include the encrypted second encryption key; and
    encoding a payload of the at least a first file to include the second encryption key associated with the at least a third file of the plurality of files.

17. The system of claim 16, the operations further comprising:
    encoding the header to further include first identification (ID) of the public key and a second ID of the second encryption key; and
    updating the first ID and the second ID based on detecting a key rotation at the first database deployment.

18. The system of claim 11, wherein the first encryption key is a data encryption key, and the operations further comprising:
    encoding the data encryption key using the first encryption key to generate an encrypted data encryption key; and
    encoding the first encryption key using a public key of the second database deployment.

19. The system of claim 18, the operations further comprising:
    encoding the at least a first file to include the encrypted data encryption key and the public key of the second database deployment before the transmission of the data stream.

20. The system of claim 11, the operations further comprising:
    periodically regenerating the first encryption key and the second encryption key to generate an updated first encryption key and an updated second encryption key;
    encoding a configuration message for transmission to the second database deployment, the configuration message including the updated first encryption key and the updated second encryption key for decoding a subsequent transmission of the data stream.

21. A non-transitory computer-storage medium embodying instructions that, when executed by a machine of a first database deployment, cause the machine to perform operations comprising:
    selecting data for transmission to a second database deployment, the data comprising a plurality of files forming a data stream;
    encoding at least a first file of the plurality of files using a first encryption key, the first encryption key stored in at least a second file of the plurality of files;
    further encoding the at least a first file to include a second encryption key associated with at least a third file of the plurality of files;
    identifying a set of nodes in a virtual private network connected to the first database deployment and the second database deployment; and
    causing transmission of the data stream from the first database deployment to the second database deployment via the set of nodes of the virtual private network that is connected to the first database deployment and the second database deployment.

22. The non-transitory computer-storage medium of claim 21, the operations further comprising:
    causing transmission of the at least a second file prior to the at least a first file; and
    causing transmission of the at least a third file after the at least a first file.

23. The non-transitory computer-storage medium of claim 21, wherein the first encryption key is a data encryption key, and the operations further comprising:
    encoding the data encryption key using the first encryption key to generate an encrypted data encryption key.

24. The non-transitory computer-storage medium of claim 23, the operations further comprising:
    encoding the at least a first file to include the encrypted data encryption key.

25. The non-transitory computer-storage medium of claim 21, the operations further comprising:
    encoding the second encryption key using a public key of the second database deployment, to generate an encrypted second encryption key.

26. The non-transitory computer-storage medium of claim 25, the operations further comprising:
    encoding a header of the at least a first file to include the encrypted second encryption key; and
    encoding a payload of the at least a first file to include the second encryption key associated with the at least a third file of the plurality of files.

27. The non-transitory computer-storage medium of claim 26, the operations further comprising:
    encoding the header to further include first identification (ID) of the public key and a second ID of the second encryption key; and
    updating the first ID and the second ID based on detecting a key rotation at the first database deployment.

28. The non-transitory computer-storage medium of claim 21, wherein the first encryption key is a data encryption key, and the operations further comprising:
    encoding the data encryption key using the first encryption key to generate an encrypted data encryption key; and
    encoding the first encryption key using a public key of the second database deployment.

29. The non-transitory computer-storage medium of claim 28, the operations further comprising:
    encoding the at least a first file to include the encrypted data encryption key and the public key of the second database deployment before the transmission of the data stream.

30. The non-transitory computer-storage medium of claim 21, the operations further comprising:
    periodically regenerating the first encryption key and the second encryption key to generate an updated first encryption key and an updated second encryption key;
    encoding a configuration message for transmission to the second database deployment, the configuration message including the updated first encryption key and the updated second encryption key for decoding a subsequent transmission of the data stream.

* * * * *